Aug. 16, 1927.

T. H. LAUTENSCHLAGER

VALVE STEM CAP OR THE LIKE 1,639,303

Filed Jan. 3, 1927

INVENTOR.
ATTORNEY.

Patented Aug. 16, 1927.

1,639,303

UNITED STATES PATENT OFFICE.

THURMAN H. LAUTENSCHLAGER, OF DAYTON, OHIO.

VALVE-STEM CAP OR THE LIKE.

Application filed January 3, 1927. Serial No. 158,523.

This invention relates to valve stem caps having particular reference to dust caps for pneumatic tire inner tube valve stem dust caps.

In the accompanying drawings which serve to illustrate the invention:

The novelty of the invention, as here shown, consists in an extension 1 of the dust cap 2 for a reserve valve core 3.

Figure 1:
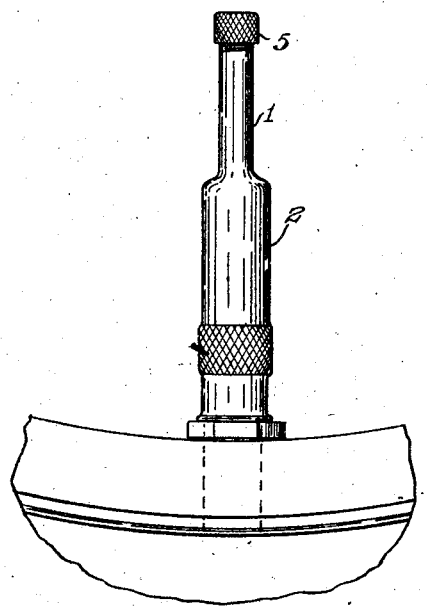
Fig. 1 is a view of the valve stem cap as related to the rim of a wheel.
Figure 2:
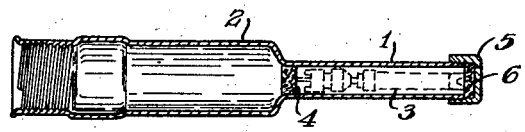
Fig. 2 is a view of the cap in longitudinal section.

As shown in Fig. 2, the detail parts consist in the extended portion 1 which is reduced in diameter and formed integrally with portion 2. The inner end of the extended portion is closed by a plug 4, made preferably of rubber or leather and pressed into the opening to form a seat for the valve core 3. The outer end of portion 1 is closed by a threaded cap 5 in which is pressed a plug 6 which acts as a seat for the opposite end of the core, the core being compressed between the seats 4—6 to hold the same in fixed relation in the container 1.

Figure 3:
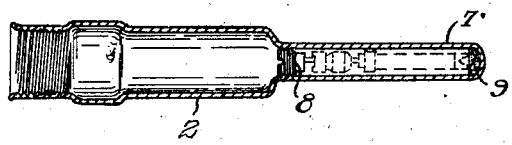
Fig. 3 is a view of the cap in longitudinal section showing a modification.

The modification illustrated in Fig. 3 consists in forming the outer end of the extended portion 7 closed, the inner end being closed by a threaded plug 8. The valve core is compressed between plug 8 and a plug 9 pressed into the end of portion 7.

The details of the arrangement are immaterial, as any suitable construction will answer the purpose of the invention, the object being to provide a container associated with the valve stem dust cap suitable for carrying a reserve valve core so that the same will be at hand and conveniently available when needed, the means for carrying the reserve valve cores serving to insure their being at hand in emergencies when tire service may not otherwise be available.

Having described my invention, I claim:

1. A valve stem dust cap including an axially extended portion of the cap and means for carrying a valve core therein.

2. A valve stem dust cap including an axially extended portion of the cap reduced in diameter and means including oppositely arranged seats for supporting a valve core therein.

3. A valve stem dust cap including an axially extended portion of the cap reduced in diameter and means in said extended portion for carrying a valve core, including opposite seats arranged for compressing the core therebetween.

In testimony whereof, I affix my signature.

THURMAN H. LAUTENSCHLAGER.